United States Patent
Dara

[11] Patent Number: 5,469,595
[45] Date of Patent: Nov. 28, 1995

[54] WINDSHIELD WIPER BLADE SLAPPER APPARATUS

[76] Inventor: Chester P. Dara, 4455 Corriander, Sterling Heights, Mich. 48314

[21] Appl. No.: 262,839

[22] Filed: Jun. 21, 1994

[51] Int. Cl.$^6$ .................................. B60S 1/32; B60S 1/44
[52] U.S. Cl. .................... 15/250.19; 15/250.351
[58] Field of Search ............. 15/250.19, 250.20, 15/250.35, 250.16, 250.31, 250.30, 250.34

[56] References Cited

U.S. PATENT DOCUMENTS

| 2,187,876 | 1/1940 | Ericson | 15/250.40 |
|---|---|---|---|
| 2,306,980 | 12/1942 | Roberts | 15/250.19 |
| 2,337,879 | 12/1943 | Folberth et al. | 15/250.19 |
| 2,717,408 | 9/1955 | Le Page | 15/250.19 |
| 2,784,438 | 3/1957 | Petersen | 15/250.19 |
| 4,370,774 | 2/1983 | Bienert et al. | 15/250.20 |
| 4,439,886 | 4/1984 | Yagasaki et al. | 15/250.20 |
| 4,736,484 | 4/1988 | Bauer et al. | 15/250.20 |
| 4,907,315 | 3/1990 | Arai et al. | 15/250.19 |

FOREIGN PATENT DOCUMENTS

| 716478 | 1/1942 | Germany . | |
|---|---|---|---|
| 737403 | 7/1943 | Germany . | |
| 95234 | 6/1982 | Japan | 15/250.19 |
| 96459 | 4/1991 | Japan | 15/250.20 |
| 85150 | 3/1992 | Japan | 15/250.19 |
| 510066 | 7/1939 | United Kingdom | 15/250.19 |

*Primary Examiner*—Gary K. Graham
*Attorney, Agent, or Firm*—Cushman, Darby & Cushman

[57] ABSTRACT

A windshield wiper assembly produces an automatic lifting and snapping action of an oscillating wiper arm to slap a wiper blade against a windshield of an automobile when an initiator arm is in an engagement position. The wiper arm is pivoted on a wiper base when a bell crank, which is connected to the wiper base, engages the initiator arm. When the wiper base oscillates in a first direction across the initiator arm, the bell crank pushes a lever, which in turn raises the tension vector from a spring connected between first and second tension points in the wiper arm above the pivot point and the wiper arm is lifted from the windshield. When the wiper base oscillates in an opposite direction over the initiator arm, the bell crank lowers the lever, which in turn lowers the tension vector below the pivotal connection and slaps the wiper arm back toward the windshield. The initiator arm may be continuously placed into the engagement position to cause a repeating slapping action, or it may be controllably swung into the engagement position at predetermined intervals to provide an occasional slapping action of the wiper against the windshield.

15 Claims, 5 Drawing Sheets

WINDSHIELD WIPER BLADE SLAPPER APPARATUS

FIELD OF THE INVENTION

The present invention relates to the removal of debris from windshield wiper blades. More specifically, the invention is directed to a mechanism for automatically slapping a windshield wiper blade against an automobile windshield for the removal of ice, sleet, snow, leaves or other debris therefrom.

DESCRIPTION OF RELATED ART

Windshield wiper mechanisms which slap a windshield wiper blade against a windshield have been known in the art, however those known mechanisms relate to the designs of older style windshield wipers and typically require excessive operation by the driver of the vehicle.

In one windshield wiper mechanism known in the art, U.S. Pat. No. 2,306,980 to Roberts, a windshield wiper blade cleaning device has a support plate adhered to the windshield of an automobile with suction cups such that the arm portion of a windshield wiper blade crosses the surface of the support plate when in operation. The support plate has a sufficient thickness to allow a spring-loaded ramp-like notch to protrude from and recede into the support plate, depending upon the direction of travel of the wiper arm. The spring-loaded ramp-like notch protrudes from the support plate when the arm of the wiper blade engages the ramp-like notch in a first wiping direction causing the windshield wiper blade to be gradually lifted from the glass and fall back to the glass once over the ramp when encountering the ramp-like notch. The ramp-like notch retreats back into the support plate when engaged by the wiper arm in the opposite wiping direction. This structure has many disadvantages, including excessive noise and wear caused by the engagement of the wiper arm against the ramp-like notch. Additionally, the support base is secured to the windshield and thereby impairs vision.

Another windshield wiper mechanism known in the art is in U.S. Pat. No. 2,717,408 to Le Page. In this apparatus, when a knob is pulled from inside an automobile, a plunger mechanically rises near the base of the arm of a windshield wiper. At the end of the plunger is a cross bar which presses against the underside of the wiper arm during the entire wiping cycle thereby to raise the wiper from the windshield. The wiper will remain raised until the plunger is lowered by the release of the knob by the driver. For each slap of the wiper, the driver must pull and release the knob. This mechanism therefore requires a driver's extended attention while in operation. The driver must repeatedly pull and release the knob inside the automobile to operate the mechanism continually.

In German patent 737403, the wiper arm pivots on the motor shaft, and a center rod is fixed to the base of a wiper arm. The center rod engages the wiper arm at the base, just radially inward from the pivot point of the wiper arm. To raise the wiper arm, the center rod is mechanically pushed by the driver pushing a knob attached to the opposite end of the center rod. To lower the wiper arm the center rod is pulled by the driver. This mechanism requires a tremendous amount of driver attention. Furthermore, the placement of the knob, which must be at the end of the center rod, is not amenable to automobile designs of today.

These above described structures have many disadvantages. For instance, only one slap of the wiper against the windshield is obtained for any one engagement and release of the mechanisms. In addition, the speed of the slap, and the location of where the wiper will slap against the windshield is dependent upon the driver, causing much distraction from driving.

In another known mechanism, which is disclosed in German patent No. 716,478, a wiper arm pivots to a radially inward side of a motor shaft. A cam located on the axis of the wiper motor pushes a center rod up through the center of the motor shaft toward the base of the wiper arm when the wiper arm oscillates in a first direction through a predetermined position. The center rod is then pulled back from the base of the wiper arm when the wiper arm oscillates back through the predetermined position. The wiper arm is pivoted such that when the center rod pushes the center rod, the wiper blade is pivoted and lifted off of the windshield, and when the center rod is pulled back, the wiper blade is lowered back onto the windshield. This system has many disadvantages. For instance, a very high torque is necessary to lift the wiper because of the close radial proximity of the center rod to the pivot of the wiper arm. This high torque causes fatigue in the center rod and excessive wear on the wiper motor. In addition, this mechanism does not cause a slap, rather it gradually raises, then gradually lowers the wiper blade from the windshield. The gradual lowering of the wiper blade does not remove debris from the wiper blade as effectively as does a slap.

In addition to the above mentioned disadvantages of the known mechanisms, the mechanisms described above are old and inapplicable to wiper blade designs on automobiles of today. The designs of automobiles today have windshields shaped such that many external mechanisms applied to the windshield cause an obstruction of the driver's view, such as would be necessary for the mechanism of the above discussed Roberts U.S. Pat. No. 2,306,980. Furthermore, the known mechanisms cause excessive wear to the motor and other mechanical parts because of the high torque required. Moreover, the known mechanisms make excessive noise because all of the energy required to lift the wiper blade from the windshield comes from the mechanical force applied, with no assistance from the spring of the wiper arm as in the present invention. In addition, the known mechanisms do not account for wiper arm designs wherein the wiper arm pivot point is substantially radially outward from the axis of the drive motor, as is the prevalent design of windshield wiper assemblies on automobiles of today. Most windshield wiper assemblies today have an extended wiper base which accept the motor shaft at one end and pivotally connect to the wiper arm at an opposite end.

Therefore, there is the need for a simple and automatic mechanism for modern wiper blade assemblies which cause the blade to slap against the windshield and which do not require the attention of or operation by the driver other than a turning on and off of an automatic operation of the mechanism to thereby remove ice, sleet, leaves, or other debris which may be present on the wiper blades.

SUMMARY OF THE INVENTION

The present invention overcomes the above deficiencies of the mechanisms known in the art. Therefore, an object of the present invention is to provide a windshield wiper blade mechanism which is automatic to the driver of the automobile, which requires little effort from the driver of the vehicle to operate, which has reduced mechanical wear and noise, and which is simple enough to be reliable and dependable.

An apparatus is provided whereby a windshield wiper assembly automatically lifts and lowers a wiper arm with a snap action for slapping a wiper blade against a windshield of an automobile when activated. In more detail, the wiper arm is pivoted on the wiper base, both outwardly from the windshield and inwardly toward the windshield, when a bell crank connected to the wiper base engages an initiator arm during normal oscillation of the wiper arm. When the wiper base travels in one direction during oscillation, the engagement causes the bell crank to raise a lever, which in turn raises the tension vector from a bias spring connected between the wiper arm at a position radially outward from its pivotal connection and the wiper base: at a position radially inward from the pivotal connection. The raised tension vector of the spring lifts the wiper arm. When the wiper base travels in the opposite direction, the bell crank lowers the lever, which in turn lowers the tension vector below the pivotal connection in a snap action, thereby snapping the wiper arm back toward the windshield and slapping the wiper blade against the windshield. The initiator arm may be removed from an engagement position relative to the bell crank by the driver at the end of any wiping cycle, thereby stopping the slapping action. On the other hand, the initiator arm may be placed in an engagement position for just a single wiping cycle or continually for repeating a slapping action at each wiping cycle. Additionally, it may be controllably moved into the engagement position at predetermined intervals to provide an occasional slapping action of the wiper against the windshield.

BRIEF DESCRIPTION OF THE DRAWINGS

The above objects and other advantages of the present invention will become more apparent by describing in detail a preferred embodiment of the present invention with reference to the attached drawings, in which.

DESCRIPTION OF THE PREFERRED EMBODIMENTS

A preferred embodiment of the present invention is now described in more detail with reference to the attached drawings.

Figure 1:
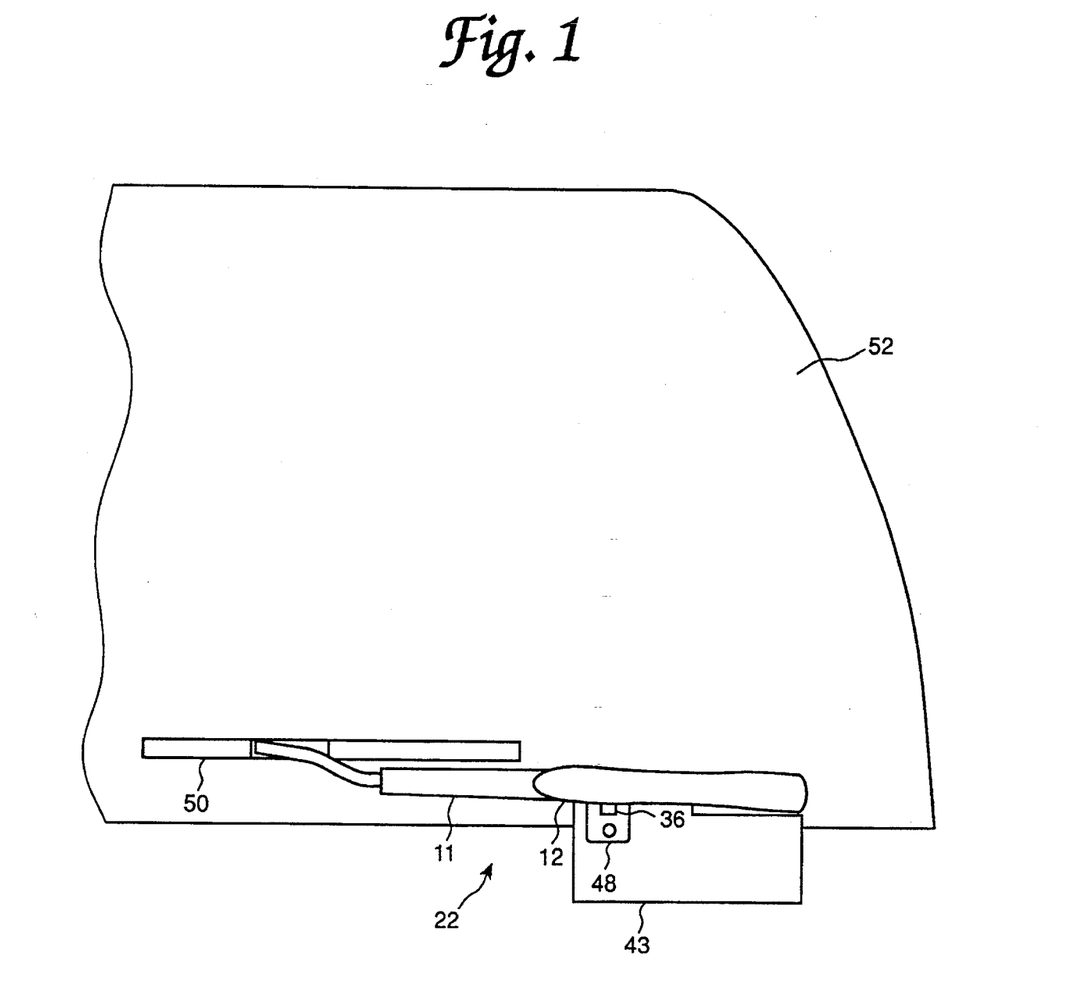
FIG. 1 is a diagrammatic partial elevational view of a windshield wiper assembly of an embodiment of the present invention.

FIG. 1 shows generally a windshield 52 of a vehicle having a windshield wiper assembly 22 of an embodiment of the present invention. Only one windshield wiper assembly 22 is shown, however two or more may be used for a single windshield 52. In a vehicle employing the preferred embodiment, a windshield wiper assembly 22 is employed in each half of the windshield 52. The windshield wiper assembly generally includes a wiper base 12, a wiper arm 11, and a wiper blade 50.

Figure 2A:
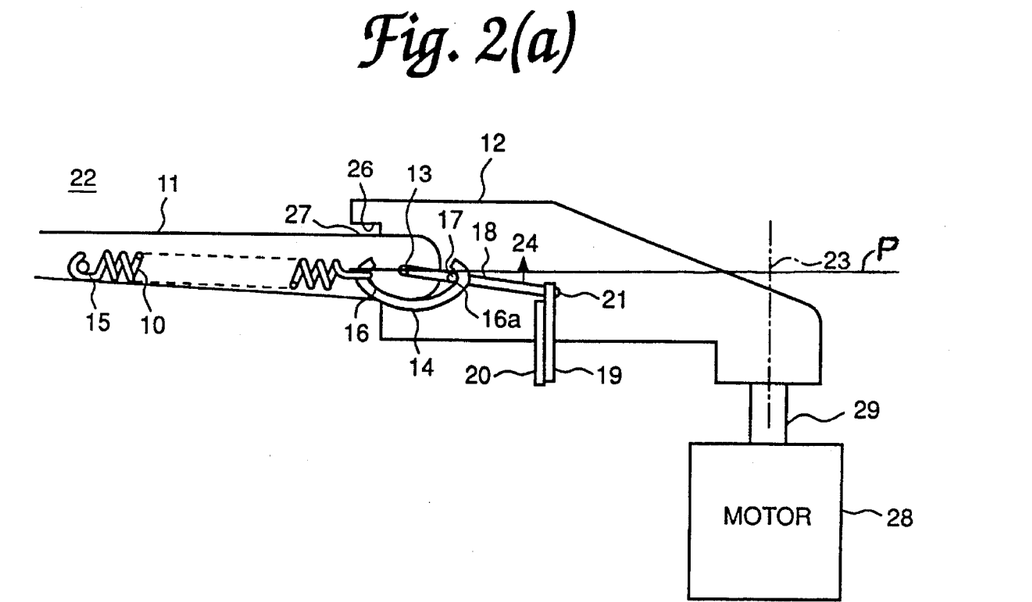
FIG. 2(a) is a diagrammatic side elevational view of a base and wiper arm portion of a windshield wiper assembly of an embodiment of the present invention having a wiper arm in a lowered position.
Figure 2B:
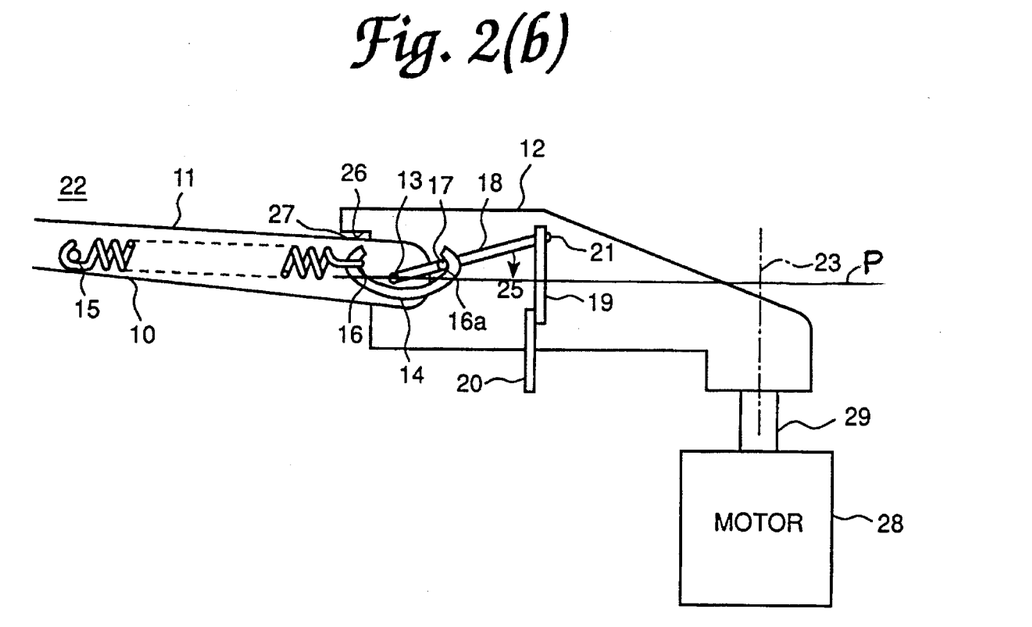
FIG. 2(b) is a diagrammatic side elevational view of a base and wiper arm portion of a windshield wiper assembly of an embodiment of the present invention having a wiper arm in a raised position.

FIGS. 2(a), 2(b), and 4(a) through 4(f) show further views of the windshield wiper assembly 22 according to the present invention. FIG. 2(a) shows a wiper arm 11 of the windshield wiper assembly 22 in a lowered position and FIG. 2(b) shows the wiper arm 11 in a raised position, i.e., when lifted off a windshield 52.

The windshield wiper arm 11 pivots on the wiper base 12 at an arm pivot 13 about a pivot axis. The windshield wiper assembly 22 extends radially from the wiper drive axis 23, and a standard wiper motor apparatus 28 as wiper motor means oscillates the windshield wiper assembly 22 about the wiper drive axis 23 on an oscillating shaft 29. The wiper motor apparatus 28 and shaft 29, including means in the wiper motor apparatus 28 for oscillation of the shaft 29, are conventionally known.

The windshield wiper assembly 22 further includes a bias spring 10 which forms spring means or bias means and is extended between a pin 15 and a first spring connection hook 16 of a curved spring connector 14. At its other end spring connector 14 has a second spring connection hook 16a which hooks over a pin 17, thereby extending the: tension end point of spring 10 to pin 17. The pin 17 of the lever 18 may extend therefrom or it may be formed within the lever 18 width appropriate clearances made therein for the unobstructed motion of the spring connector 14. The spring connector 14 curves below and around the arm pivot 13, thus allowing a vector of the spring tension to pass above and below a plane P without interference. The curved spring connector 14 forms spring connector means.

The lever 18 forms lever means and is secured at the arm pivot 13 so that it rotates from its position illustrated in FIG. 2(a) upwardly as shown by arrow 24, and from its other position illustrated in FIG. 2(b) downwardly as shown by arrow 25. Movement of the lever 18 between those two positions causes the spring connector 14 to rise and lower with its mid-section staying always below arm pivot 13. One end of a push/pull rod 19 which forms push/pull means is hinged to the lever 18 with a screw or pin 21, and the other end of the push/pull rod 19 is rotatably affixed to a bell crank 20 at a rotatable joint 30 (FIG. 4(a)). The bell crank 20 forms bell crank means. Operation of the bell crank 20 about a rotatable joint 35 fixed to a wing 36 extending from the wiper base 12 causes the push/pull rod 19 to raise and lower the lever 18.

The extension of the spring 10 causes tension between pin 15 on the wiper arm 11 and pin 17 on the lever 18. FIGS. 2(a) and 2(b) show the operation of the snap action means. In FIG. 2(a) where the wiper arm 11 is shown in the lowered position, the spring connector 14 is held in a lowered position below the arm pivot 13 by operation of the lever 18, which places the tension vector of the spring 10 between pin 15 and pin 17 below the arm pivot 13. The tension vector being below the arm pivot 13 urges the wiper arm 11 toward the windshield 52, causing a wiper blade 50 on the wiper arm 11 to be held against the windshield 52.

When lever 18 is moved upward in direction 24 from its position in FIG. 2(a), the tension of spring 10 gradually increases until it reaches maximum when points 15, 13 and 17 are in line. During further upward movement of lever 18, spring connection hooks 16, 16a move above the line of pin 15 and arm pivot 13, thereby pulling wiper arm 11 upward with a snap action due to the bias of the spring 10 and thus moving the wiper blade 50 off of the windshield 52. This results in the wiper arm 11 being in the position shown in FIG. 2(b).

FIG. 2(b) shows the extension of the spring 10 while the wiper arm 11 is in the raised position. The spring connector 14 is held in the raised position by operation of the lever 18, which places spring connection hooks 16, 16a of the spring connector 14 above the arm pivot 13, and therefore causes the tension vector of the spring 10 between pin 15 and pin 17 to be above the arm pivot. An upper surface portion 27 of the wiper arm 11 is thereby held upward against a stop portion 26 of the wiper base 12 in direction 25.

When lever 18 is moved downward in direction 25 from its position in FIG. 2(b), the tension of spring 10 gradually increases until it reaches maximum when points 15, 13 and 17 are in line. During further downward movement of lever 18, spring connection hooks 16, 16a move below the line of pin 15 and arm pivot 13, thereby pulling wiper arm 11 downward with a snap action, causing the wiper blade 50 to slap against the windshield 52. This results in the wiper arm 11 again being in the position shown in FIG. 2(a).

The tension of the spring may be adjusted to adjust the pressure of the wiper blade 50 against the windshield 52 and thus the speed and strength of the slap of the wiper blade 50 against the windshield 52. The stronger the spring, the stronger the tension and slap of the wiper blade 50 against the windshield 52, and vice versa. The spring tension can also be adjusted by moving pin 15 on the wiper arm or pin 17 on the lever 18 further away from the arm pivot 13. A spring of variable tension can also be used.

Figure 3:
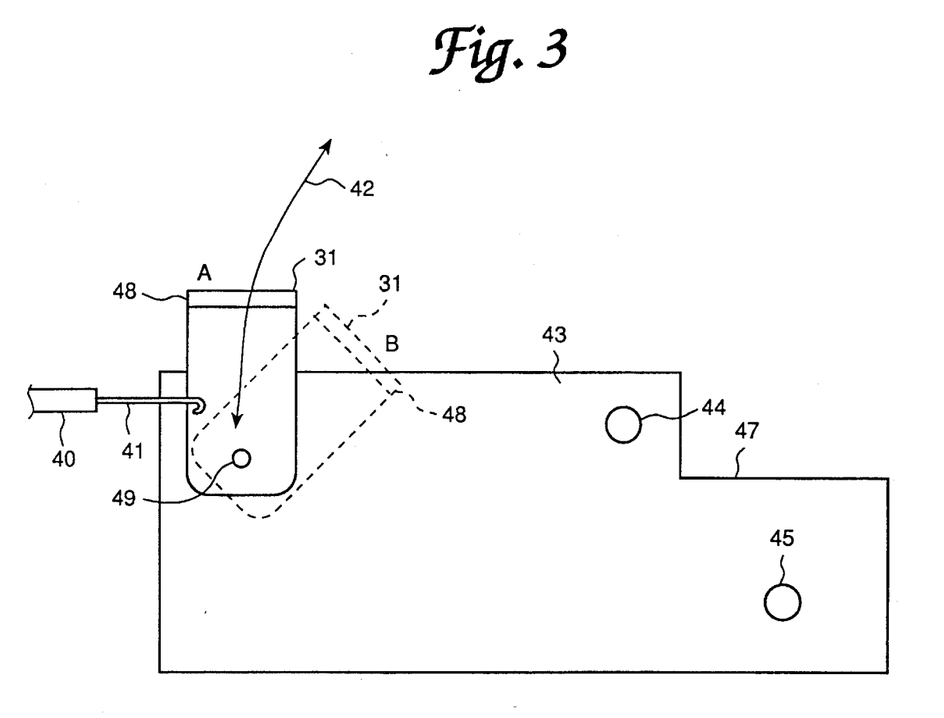
FIG. 3 is a diagrammatic top view of an initiator arm and support for engaging a bell crank connected to the wiper base of a windshield wiper assembly according to an embodiment of the present invention.

FIGS. 1 and 3 show a support 43 which lies horizontally underneath the wiper base 12 of the windshield wiper assembly 22 and below the windshield 52 so as not to obstruct the driver's view. An initiator arm 31, which forms control means, is rotatably mounted to the support 43 by pin 49 which allows rotation of the initiator arm 31 between an engagement position A (shown in solid lines) and a non-engagement position B (depicted in dotted lines). When in the engagement position A, the initiator arm 31 causes activation of the snapping action. Initiator arm 31 has on its outer end a catch portion 48 which protrudes at a right angle toward the wiper base 12 (vertically, out of the paper in FIG. 3) relative to the rest of the initiator arm 31. The windshield wiper assembly 22 is located above the support 43 such that when the initiator arm 31 is in the engagement position A, the bell crank 20 passes over catch portion 48 of the initiator arm 31 at a predetermined point of operation of the windshield wiper assembly 22 as it travels back and forth in the directions indicated by arrow 42. Mounting holes 44, 45 in the support 43 allow for a mounting of the support 43 with bolts (not shown) to a vehicle. A cut-out portion 47 allows for the oscillating shaft 29 of the wiper motor apparatus 28 to connect to the wiper base 12.

The initiator arm 31 is moved between the engagement position A and the non-engagement position B by one end of a cable 41. Engagement means is shown as a cable 41 contained within a cable sleeve 40 and :supportably mounted near the initiator arm 31 so that it mechanically rotates the initiator arm 31 between the engagement position A and the non-engagement position B under control of the driver of the vehicle.

The cable can be manually operated by the driver inside the vehicle with a push/pull knob connected to an opposite end of the cable 41, or the opposite end of the cable may be adapted to a solenoid or a motor to enable electrical control by the driver. A solenoid or motor may instead be engagement means directly adapted to the initiator arm 31 without using the cable 41. With a solenoid or a motor, the position of the initiator arm 31 is electrically controlled. The electrical control can be a switch located in the interior of the vehicle, or it can be integrated into a control arm on the steering column of the vehicle, such as the wiper/washer control arm. Furthermore, the electrical control of the initiator arm 31 may be integrated into a microcomputer.

The lever 18, push/pull rod 19, bell crank 20, the spring connector 14, and other similar components may be made of a suitably strong material, such as spring steel.

The operation of the mechanism whereby an automatic slapping operation of the wiper blade 50 is caused against the windshield 52 is now described with additional reference to FIGS. 4(a) through 4(f). The means for motion translation includes bell crank lever 20. However, other means for translating the motion in the wiping direction to motion in a direction generally perpendicular to the wiping direction can be substituted and is to be understood as motion translation means.

For simplicity, FIGS. 4(a) through 4(f) schematically show only the bell crank 20 and the push/pull rod 19 of FIG. 2(a) as they engage the catch portion 48 of initiator arm 31, looking leftward from the axis 23 in FIG. 2(a), together with the initiator arm 31. The wiper base 12 is shown in dotted lines and includes a wing portion 36 which rotatably contains the bell crank 20 at the rotatable joint 35. Arms 20(a) and 20(b) of bell crank 20 have opposing inner sides 33 and 34, respectively.

Figure 4A:
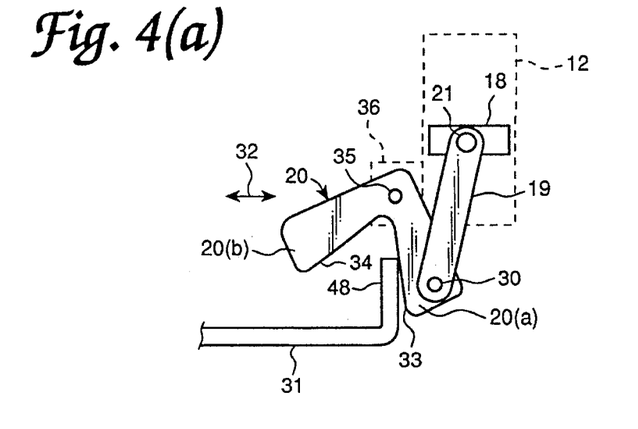
FIGS. 4(a) through 4(c) are diagrammatic views successively showing the operation of the initiator arm as it engages the bell crank of a motion translation device during oscillation of a windshield wiper assembly.

In FIG. 4(a), the wiper arm 11 of the windshield wiper assembly 22 is in the lowered position as the windshield wiper assembly 22 moves back and forth in the opposite directions of arrow 32 over the plane of the windshield 52. An initiator arm 31 is moved into the engagement position A by control of the driver of the vehicle. As the windshield wiper assembly 22 travels in the leftward direction of arrow 32 over the initiator arm 31, the inner side 33 of the bell crank arm 20(a) engages the catch portion 48 of the initiator arm 31. Since the catch portion 48 is stationary, bell crank 20 rotates, counterclockwise in FIG. 4(a). This contact between the push side 33 of the bell crank 20 and the catch portion 48 of the initiator arm 31 causes the push/pull rod 19 to move upward, thereby pushing the lever 18 upward as in FIG. 2(a).

Figure 4B:
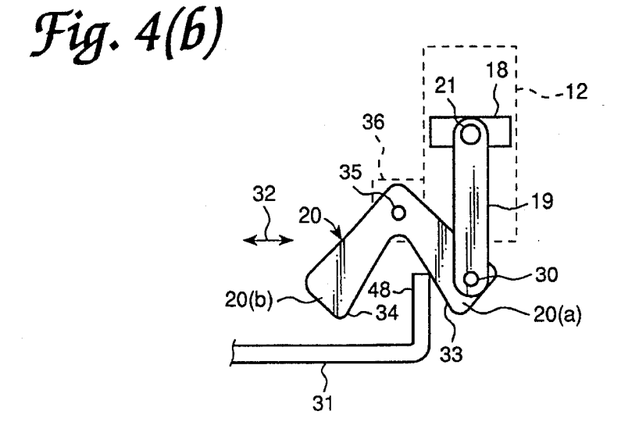

FIG. 4(b) shows the bell crank 20 at the point at which the tension vector between the pin 15 and the pin 17 crosses the arm pivot 13, i.e., when the tension is maximum. After the bell crank 20 travels past this point in the leftward direction of arrow 32, the tension vector between pins 15 and 17 rises above the arm pivot 13 and the wiper arm 11 pivots upwardly toward the position shown in FIG. 2(b) with a snap action.

Figure 4C:
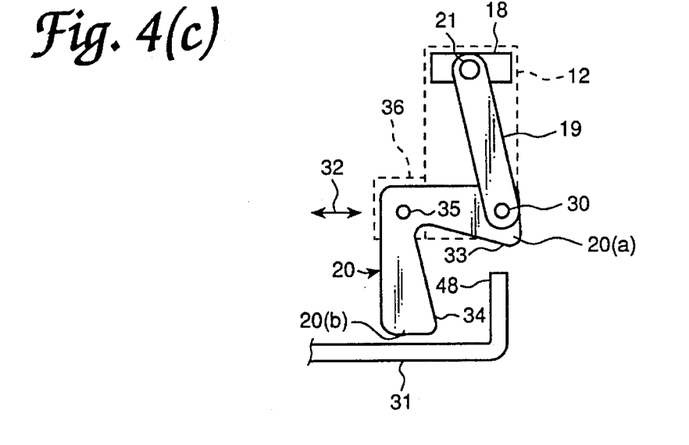

FIG. 4(c) shows the bell crank 20 in the fully raised position whereby the push/pull rod 19 has raised the lever 18 all the way upward. In the fully raised position, the spring connector 14 is also fully raised. Hence, the tension vector between pins 15 and 17 is above the arm pivot 13 and the spring 10 therefore holds the wiper arm 11 fully upward with its upper surface portion 27 in contact with the stop portion 26 of the wiper base 12.

Figure 4D:
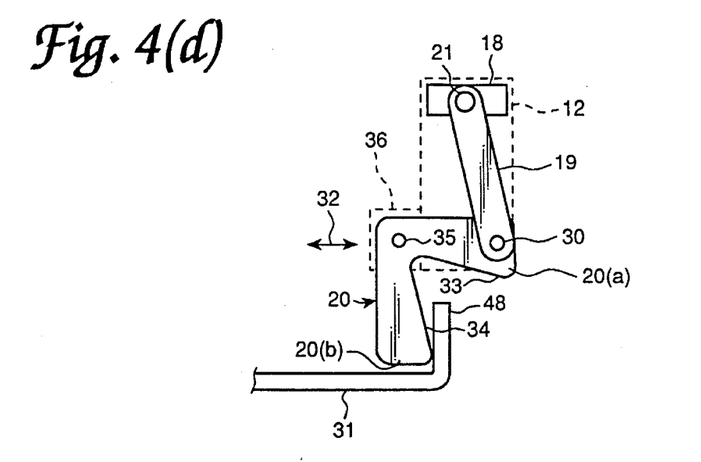
FIGS. 4(d) through 4(f) are diagrammatic views successively showing the operation of the initiator arm as it engages the bell crank of a motion translation device during an oscillation of a windshield wiper assembly.

In FIG. 4(d), the wiper arm 11 of the windshield wiper assembly 22 is in the raised position as the windshield wiper assembly 22 moves back and :forth in the opposite directions of arrow 32 over the plane of the windshield 5i. As the windshield wiper assembly 22 travels in the rightward direction of arrow 32 over the initiator arm 31, the pull side 34 of the bell crank 20 engages the catch portion 48 of the initiator arm 31, rotating the bell crank 20 clockwise in FIG. 4(d). This contact between the pull side 34 of the bell crank 20 and the catch portion 48 of the initiator arm 31 causes the push/pull rod 19 to move downward, thereby pulling the lever 18 downward.

Figure 4E:
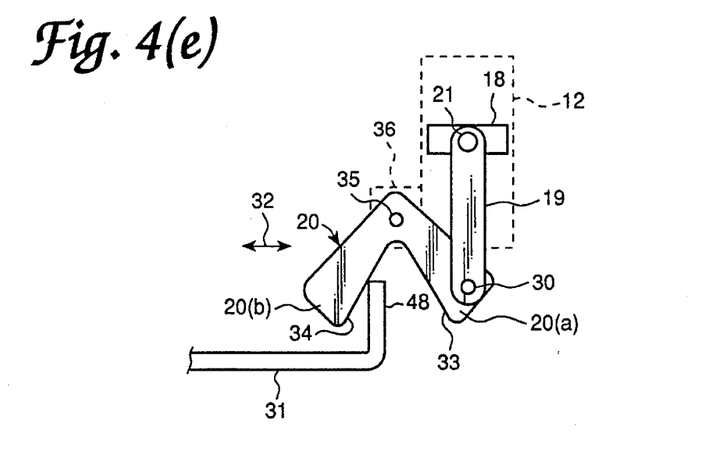

FIG. 4(e) shows the bell crank 20 at the point at which the tension vector between the pin 15 and the pin 17 crosses the arm pivot 13, i.e., when the tension is maximum. After the bell crank 20 travels past this point in the rightward direction of arrow 32, the tension vector between pins 15 and 17 lowers below the arm pivot 13 and the wiper arm 11 pivots downwardly toward the position shown in FIG. 2(a) with a snap action.

Figure 4F:
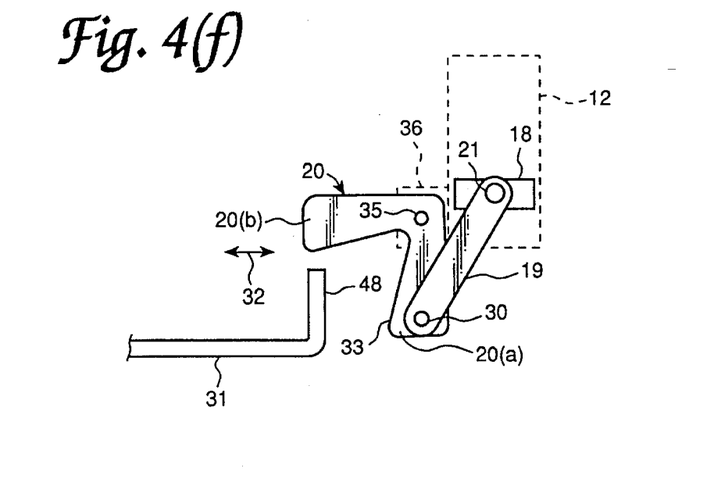

FIG. 4(f) shows the bell crank 20 in the fully lowered position whereby the push/pull rod 19 has lowered the lever 18 all the way downward. In the fully lowered position, the spring connector 14 is also fully lowered. Hence, the tension vector between pins 15 and 17 is below the arm pivot 13 and the spring 10 therefore holds the wiper blade 50 on the wiper arm 11 against the windshield 52.

The present invention repeatedly raises and lowers the wiper blade 50 against the windshield 52 without any further intervention or operation of the driver so long as the initiator arm 31 remains in the engagement position A.

The slapping operation can also be controlled to occur in intervals. The initiator arm 31 can be electrically controlled to move to the engagement position, A for one wiping cycle of the windshield wiper assembly 22, thereby causing a single slap of the wiper against the windshield 52, and then rotate to the non-engagement position B for a predetermined number-of wiping cycles. This momentary control of the slapping operation can be caused to occur repeatedly after a predetermined number of wiper rotations, or it can be caused to occur repeatedly during every wiper rotation such as might be necessary during heavy ice storms.

The mechanism of the present invention is relatively quiet, reliable, simple to integrate into existing automobile and wiper designs, and will not wear quickly because of the limited mechanical contact being concentrated in the area of the bell crank 20 and initiator arm 31. The mechanism of the present invention also reduces noise and mechanical strain on the wiper motor apparatus 28 because the tension of the spring 10 is used to raise the wiper blade 50 from the windshield 52.

While the present invention has been particularly shown and described with reference to a preferred embodiment and alterations thereto, it will be understood by those skilled in the art that various changes in form and details may be effected therein without departing from the spirit and scope of the invention as defined by the appended claims.

What is claimed is:

1. A windshield wiper arm apparatus for lifting and slapping a windshield wiper blade against a vehicle windshield, said apparatus comprising:

a wiper base mounted for oscillation about a drive axis;

a wiper arm pivotally connected to said wiper base for movement about a pivot axis, said pivotal connection allowing said wiper arm to pivot away from and toward a given position;

an elongated lever having a first end pivoted to said wiper base and wiper arm at said pivot axis; and a spring coupled to said arm and said lever for producing a tension vector between a first tension point on said wiper arm positioned perpendicularly further from said drive axis than said pivot axis, and a second tension point on said lever positioned perpendicularly closer to said drive axis than said pivot axis;

said lever being movable between a first lever position at which said tension vector is to one side of a plane which is substantially perpendicular to said drive axis and contains said pivot axis and a second lever position at which said tension vector is to an opposite side of said plane containing said pivot axis;

said wiper arm being pivoted away from said given position about said pivotal connection when said lever moves to said first lever position, and said wiper arm being pivoted toward said given position with a spring snapping action when said lever moves to said second lever position.

2. A windshield wiper arm apparatus according to claim 1, wherein said spring has a first end connected to said wiper arm at said first tension point, said apparatus further comprising a spring connector connected to a second end of said spring and to said lever at said second tension point, wherein said spring connector allows said tension vector to pass to said opposite sides of said plane containing said pivot axis without said spring interfering with said pivotal connection.

3. A windshield wiper arm apparatus according to claim 2, wherein said spring connector is curved and has a mid-section which remains on said opposite side of said plane containing said pivot axis when said lever is in both of said first and second positions.

4. A windshield wiper arm apparatus for lifting and slapping a windshield wiper blade against a vehicle windshield, said apparatus comprising:

a wiper base mounted for ocsillation about a drive axis;

a wiper arm having pivotal connection to said wiper base, said pivotal connection allowing said wiper arm to pivot away from and toward a given position;

an elongated having a first end pivoted to one of said wiper base and wiper arm for movement about a pivot axis and said lever having a second end;

a spring coupled to said arm and said lever for producing a tension vector between a first tension point on said wiper arm positioned perpendicularly further from said drive axis than said pivot axis and a second tension point on said lever positioned perpendicularly closer to said drive axis than said pivot axis;

a bell crank rotatably attached to said wiper base and having a first bell crank position and a second bell crank position angularly displaced from said first bell crank position; and a push/pull rod connected between said bell crank and said second end of said lever;

said lever being movable between a first lever position at which said tension vector is to one side of a plane which is substantially perpendicular to said drive axis and contains said pivot axis and a second lever position at which said tension vector is to an opposite side of said plane containing said pivot axis;

said wiper arm being pivoted away from said given position about said pivotal connection when said lever moves to said first lever position, and said wiper arm being pivoted toward said given position with a spring snapping action when said lever moves to said second lever position; and said push/pull rod places said lever in said first lever position when said bell crank is in said first bell crank position and places said lever in said second lever position when said bell crank is in said second bell crank position.

5. A windshield wiper arm apparatus for automatically lifting and slapping a windshield wiper blade against a vehicle windshield, said apparatus comprising:

a wiper base mounted for oscillation about a drive axis;

a wiper arm having a pivotal connection to said wiper base, said pivotal connection allowing said wiper arm to pivot away from and toward a given position;

an elongated having a first end pivoted to one of said wiper base and wiper arm for movement about a pivot axis and said lever having a second end;

a spring coupled to said arm and said lever for producing a tension vector between a first tension point on said wiper arm positioned perpendicularly further from said drive axis than said pivot axis and a second tension point on said lever positioned perpendicularly closer to said drive axis than said pivot axis;

a bell crank rotatably attached to said wiper base and having a first bell crank position and a second bell crank position angularly displaced from said first bell crank position;

means for moving said wiper base in first and second wiping directions; and initiator means for moving said bell crank between said first bell crank position and said second bell crank position as said wiper base travels across said initiator means in said first and second wiping directions, respectively;

said lever being movable between a first lever position at which said tension vector is to one side of a plane which is substantially perpendicular to said drive axis and contains said pivot axis and a second lever position at which said tension vector is to an opposite side of said plane containing said pivot axis;

said wiper arm being pivoted away from said given position about said pivotal connection when said lever moves to said first lever position, and said wiper arm being pivoted toward said given position with a spring snapping action when said lever moves to said second lever position.

6. A windshield wiper arm apparatus according to claim 5, wherein said initiator means has an engagement position and a non-engagement position and further comprises engagement means for moving said initiator means between said engagement position and said non-engagement position.

7. A windshield wiper arm apparatus for automatically lifting and slapping a windshield wiper blade against a vehicle windshield, said apparatus comprising:

a wiper assembly including a wiper base and a wiper arm for carrying a wiper blade;

wiper motor means for oscillating said wiper assembly in opposite wiping directions about a drive axis;

said wiper arm being pivotally attached to said wiper base for movement about pivot axis and being movable about said pivot axis in first and second opposite pivoting directions generally perpendicular to said wiping directions;

bias means connected to said wiper assembly for holding said wiper arm in one of a first position and a second position different from said first position;

snap action means selectively operable for moving said bias means back and forth to cause a tension vector of said bias means to cross over a in said first and second opposite pivoting directions for moving said wiper arm from said first and second positions in a respective one of said first and second opposite pivoting directions with a snap action, said plane is substantially perpendicular to said drive axis and contains said pivot axis; and control means having two positions one of which engages and operates said snap action means to move said bias means back and forth as aforesaid as long as said wiper assembly is oscillated by said wiper motor means and until said control means is placed in the other position such that said control means does not engage and operate said snap action means.

8. A windshield wiper arm apparatus according to claim 7, wherein said bias means includes spring means for producing a spring tension having a first end connected to said wiper arm and a second end connected to said snap action means.

9. A windshield wiper arm apparatus according to claim 8, wherein said spring means includes spring connector means connected to said snap action means for allowing said tension vector to cross over said plane passing through said pivot axis in either of said first and second opposite pivoting directions.

10. A windshield wiper arm apparatus according to claim 7, wherein said snap action means includes:

lever means, connected to said bias means and having a first end pivotally connected to said base and arm for movement about said axis, for moving said bias means back and forth, said lever means having a second end;

push/pull means connected to said second end of said lever means, for moving said lever means between a first lever position at which said tension vector is to one side of said plane passing through said pivot axis and a second lever position at which said tension vector is to an opposite side of said plane passing through said pivot axis; and bell crank means connected to said wiper base and having one end connected to said push/pull means, for interacting with said control means and for operating said snap action means when said control means is in said position which engages said snap action means.

11. A windshield wiper arm apparatus according to claim 7, wherein said control means includes an initiator arm which has an engagement position for engaging said snap action means.

12. A windshield wiper arm apparatus for automatically lifting and slapping a windshield wiper blade against a vehicle windshield, said apparatus comprising:

a wiper assembly for carrying a wiper blade, said wiper assembly including a wiper arm pivoted to a wiper base for pivotal movement in first and second opposite pivoting direction;

wiper motor means for moving said wiper assembly in back and forth wiping directions generally perpendicular to said opposite pivoting directions;

snap action means for causing said wiper arm to move in said first and second opposite pivoting direction at least one of said first and second opposite pivoting direction movements of said wiper arm to be effected with a snap action, said snap action means comprising:

bias means connected to said wiper assembly for urging said wiper arm, in a first bias means position, to an end of said first direction movement and, in a second bias means position, to an end of said second direction movement, and lever means, connected to said bias means, for moving said bias means between said first and second bias means positions, and motion translation means, connected to said lever means, being operable to translate said movement of said wiper assembly in said back and forth wiping directions into a concurrent movement of said wiper arm about said wiper base in said first and second opposite pivoting directions; and control means having an active state for engaging and operating said motion translation means and a non-active state where said control means does not engage and operate said motion translation means.

13. A windshield wiper arm apparatus according to claim 12, wherein said motion translation means comprises:

bell crank means connected to said wiper assembly, for translating said back and forth movement of said wiper assembly into said generally perpendicular movement of said wiper arm; and push/pull means connected to said bell crank means, for moving said lever means in response to said bell crank means.

14. A windshield wiper arm apparatus according to claim 12, wherein said back and forth wiping directions occur about a drive axis, said wiper arm is pivoted to said wiper base for movement about a pivot axis and said bias means comprises:

elongated spring means for producing a spring tension having a first end connected to said wiper arm and a second end connected to said lever means.

15. A windshield wiper arm apparatus according to claim 14, further comprising spring connector means connected to said spring means and said lever means for allowing said spring tension to cross over a substantially perpendicular to said drive axis and containing said pivot axis.

* * * * *